BRUCE K. NELSON
MAURICE B. HASLAM
INVENTORS

BY *Alden D Redfield*
*Abraham Ogman*
ATTORNEYS

United States Patent Office 3,182,324
Patented May 4, 1965

3,182,324
SIGNAL SYNTHESIZING SYSTEM
Bruce K. Nelson, Concord, and Maurice B. Haslam, Waltham, Mass., assignors to Avco Manufacturing Corporation, Cincinnati, Ohio, a corporation of Delaware
Filed Apr. 1, 1959, Ser. No. 803,539
12 Claims. (Cl. 343—100)

This invention relates to a signal synthesizing system for developing a plurality of signals all having the same frequency, but having a predetermined phase relationship.

The principal use for the present invention is in the field of electronic steering of the radiation beam of an antenna, but its use is not limited thereto. In a co-pending application, Serial Number 684,366, filed September 16, 1957 by John W. Marchetti et al. entitled Steerable Antenna Array and Method of Operating Same and assigned to the assignee of this invention, electronically steerable antenna beams are discussed. As disclosed therein, each of a plurality of antenna radiators, comprising an array, is supplied with a signal having a unique phase, which signal, however, is also related to the other signals by a predetermined phase relationship. To steer the antenna beam, the phase relationship of the applied signals is varied. An important consideration in this operation is to vary the phase relationship without affecting the frequency of the signals applied to the radiators and vice versa.

In a prior system the phase relationship of the radiated signals, the signals applied to the antenna radiators, is derived from the phase relationship of certain signals whose phases are readily adjustable. The phase relationship of these signals is varied by varying their frequency. In routine steering exercises, the phase relationship is varied widely, and the frequency of these signals must be varied through a broad band of frequencies. It follows therefore, that the circuits utilizing the phase carrying signals to develop the radiated signal, must be adapted to operate through a comparable broad band of frequencies.

As is well known, circuit complexity grows with bandwidth. When compared with fixed frequency circuits, the added cost for the added complexity is appreciable. The situation is further aggravated by the fact that in steerable antenna systems, where broad band intermodulating circuits are used, they are used in large numbers.

It is an object of the invention to provide a signal synthesizing system which avoids one or more limitations and disadvantages of prior systems.

It is another object of the invention to provide a signal synthesizing system for developing a plurality of signals all having the same frequency but having a predetermined phase relationship.

Further objects of the invention comprehend:
(1) The use of simply constructed and inexpensive narrow band components in the circuit elements that are most frequently used.
(2) Utilizing signals, whose frequencies are fixed, to carry phase information.
(3) Greatly simplifying the task of rejecting spurious signals which are produced during the development of phase relationships.
(4) Simplifying the task of adjusting the phase of carrying signals by simplifying the number of components which are manipulated.
(5) The use of intermodulating, heterodyning techniques to manipulate signals for developing a plurality of signals all having the same frequency but having a predetermined phase relationship.

It is a further object of the invention to provide a transmitting system, a receiving system, or a combination of transmitting and receiving systems of simplified design for electronically steerable arrays.

A further object of the invention is to provide a transmitting and receiving system utilizing phase related radiated signals in which:
(1) Circuit elements which operate on transmitted or received signals function with a fixed frequency phase carrying signal.
(2) The means governing the frequency and the phase relationship of radiated signals operate independently of each other.

A preferred embodiment of a signal synthesizing system for developing a plurality of signals having the same frequency, and predetermined phase relationship comprises circuit means for developing a first plurality of fixed frequency signals each having a preselected phase relationship. The circuit means comprises a variable frequency signal generator whose output signal is applied to a phase shifting network having a plurality of fixed taps. The signal derived at each of these taps has a phase which is determined by the frquency of the applied signal. The circuit means also includes a fixed frequency generator whose output signal is intermodulated with the signal from the variable frequency generator for producing a sum signal whose frequency is a function of frequencies of the intermodulated signals. The sum signal is intermodulated with the phase carrying signals, and a difference signal, equal in frequency to the fixed frequency signal, is obtained. This difference signal also carried the phase information generated in the phase shaft network.

The signal synthesizing system also includes a second means for developing a second plurality of fixed frequency signals, each of which has a preselected phase. This second means is substantially identical with the first means just described.

Finally, the system includes intermodulating means for intermodulating the fixed frequency signals derived from the first and second means for generating a plurality of output signals having phases which are a function of the phases of these intermodulated fixed frequency signals.

Another embodiment of the invention comprises a transmitting and receiving means which includes a signal synthesizing system embodying the principles of the present invention for supplying signals to an array of radiating elements for electronically steering the array in azimuth and elevation.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
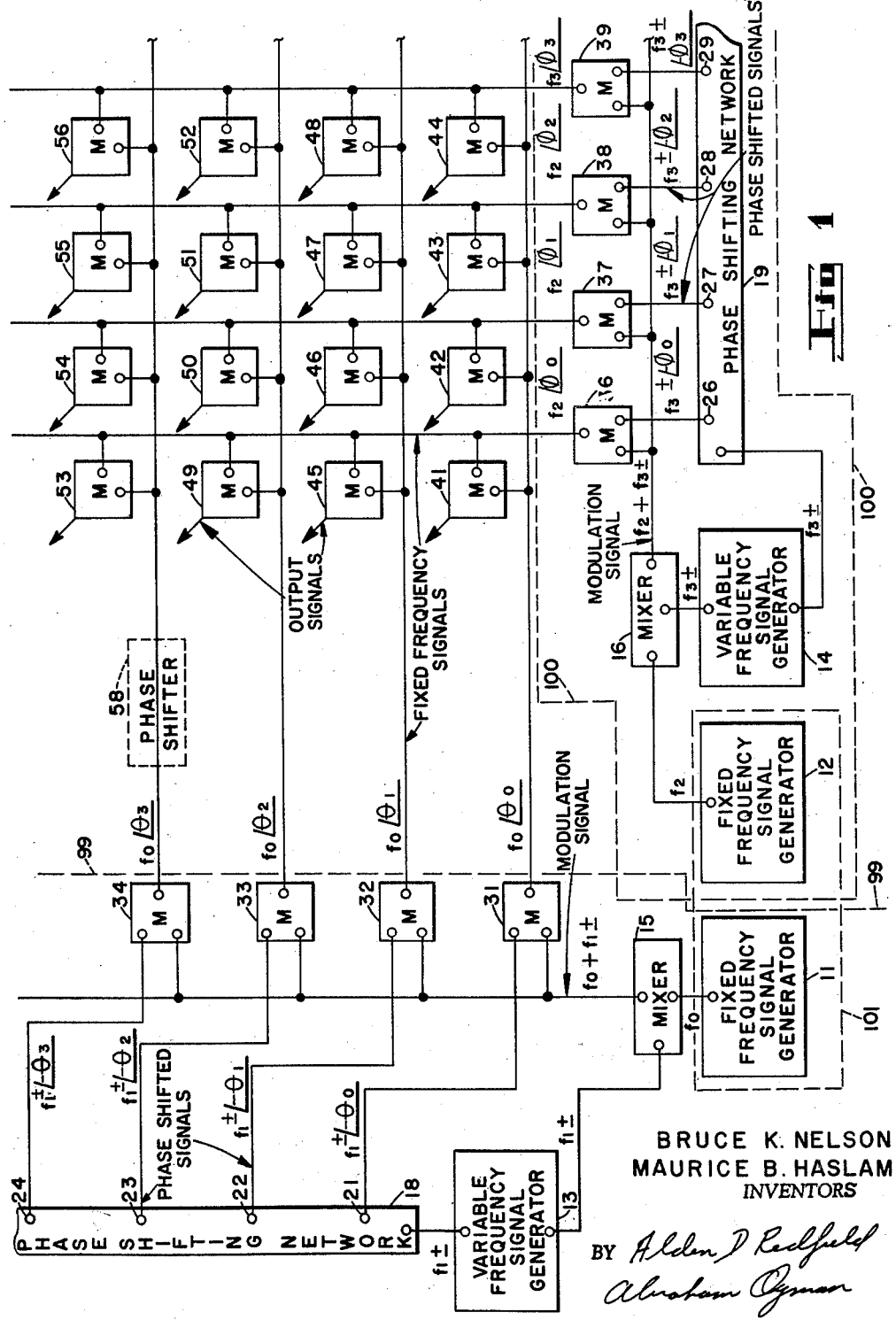
FIG. 1 is a block representation of a signal synthesizing system embodying the priniples of the present invention.

*Description of the FIG. 1 signal synthesizing system*

Referring to FIG. 1 of the drawings, there is shown a signal synthesizing system, embodying the principles of the present invention, for developing a plurality of signals having the same frequency and a predetermined phase relationship. The signal synthesizing system comprises a fixed frequency signal generating means 101 in the form of a pair of fixed frequency signal generators 11 and 12. These generators may take the form of any of the numerous crystal controlled oscillators that are used in the art. It will be obvious to a person skilled in the art that the fixed frequency signal generating means 101 may comprise a single fixed frequency signal generator with a single output circuit. In this case the output signal will be coupled to mixers 15 and 16.

The system also includes a pair of variable frequency signal generators 13 and 14, whose frequency may be accurately controlled. Since the variable frequency signal generators 13 and 14 may take the form of a reactance tube oscillator, or a Varicap controlled oscillator, both very well known in the art, it is not necessary to describe these circuit components in detail.

Also included in the signal synthesizing system, are a first and second mixing means for intermodulating the signals from the fixed frequency generators 11 and 12 with the signals from the variable frequency signal generators 13 and 14, respectively, and developing modulation signals. These mixers designated 15 and 16, may take the form of any well known crystal mixer, if the frequency will permit or any of the well known electron tube mixing circuits available. The plurality of mixers, designated M in FIG. 1 like mixers 15 and 16, are all conventional in design and in their mode of operation. A detailed description is not required. Mixing circuits for intermodulating signals has long been used in receivers and transmitters and their design will not pose any problem to a person skilled in the electronics art.

The signal synthesizing system further includes a first and a second phase shifting network coupled to the first and second variable frequency signal generators 13 and 14, respectively, for developing phase shifted signals at the respective frequencies of the generators. The phase shifting networks designated 18 and 19 may comprise a delay line or a wave guide, or other network, depending on the frequency. These phase shifting networks are provided with a plurality of fixed taps designated 21 through 24 on phase shifting network 18 and 26 through 29 on phase shifting network 19. It is well known that the phase of a signal obtained from a fixed tap on a delay line or wave guide is determined by the frequency of the signal applied thereto. Accordingly, the signals coming out of the several fixed taps are all of the same frequency but have various phases which are related to the frequency. The fixed frequency signal generator 12, variable frequency signal generator 14, mixer 16, phase shifting network 19 and the first plurality of mixers 36–39 comprise a signal supply means for generating a plurality of fixed frequency phase shifted signals. This signal supply means is shown in dotted outline 100. Its counterpart in relation to the phase shifting network 18 and variable frequency signal generator 13 is shown in the dotted outline 99.

The signal synthesizing system also includes a first and second plurality of mixing means for intermodulating the phase shifted signals from the phase shifting networks 18 and 19 with the signals derived from the mixers 15 and 16, respectively. In this connection, a plurality of mixers, designated 31 through 34, are coupled to the phase shift network 18 and the mixer 15, and in a similar manner mixers designated 36 through 39 are coupled to the phase shift network 19 and the mixer 16.

Finally, the signal synthesizing system comprises a third plurality of mixers, designated 41 through 56, for intermodulating the first and second plurality of fixed frequency phase shifted signals for developing output signals all having the same frequency, but each having a phase which is the function of the phases of the first and second fixed frequency phase shifted signals from which it is derived. It will be noted in FIG. 1 that the mixers 41 through 56 are shown in a matrix-like arrangement where each mixer is coupled to a mixer in the 31 through 34 group and a mixer in the 36 through 39 group.

The number of taps, and consequently the number of mixers connected thereto and the number of mixers in the matrix are merely illustrative. They may be reduced or enlarged in number to meet specific requirements.

*Operation of the FIG. 1 signal synthesizing system*

Referring to FIG. 1 of the drawings, assumed frequencies of the signals obtained from the various circuit elements, and the phases of these signals, have been included in the drawings to facilitate the understanding of its operation. Signals are identified by an "$f$" designation and a subscript, where the designation denotes the frequency of the signal. A "$\pm$" sign following the frequency $f_1$, and $f_3$, from the variable frequency signal generators 13 and 14, have been included to indicate that these frequencies will vary through a band of frequencies as the phase relationship of the phase shifted signals is varied. The $\pm$ sign has been carried throughout the diagram to simplify understanding the system operation. However, for the purpose of explaining the operation of the signal synthesizing system, it will be assumed that the variable frequency signal generators 13 and 14 are adjusted to the specific frequencies designated $f_1$ and $f_3$ respectively, thus providing a preselected phase relationship for the phase shifted signals.

The first plurality of fixed frequency signals, having a preselected phase is obtained as follows. An output signal the frequency $f_0$ is obtained from the fixed frequency generator 11 and coupled to an input circuit of the mixer 15. At the same time, a signal, at frequency $f_1$, from the variable frequency signal generator 13, is coupled to a second input circuit of mixer 15. The $f_0$ and $f_1$ signals are intermodulated in the mixer 15 and an output signal whose frequency is equal to the sum of the intermodulated signals, or $f_0+f_1$, is obtained from mixer 15.

It is well to interrupt the discussion at this point to point out that it is recognized that the signals derived from a mixer circuit includes the sum and differnce frequency of the input signals in addition to numerous spurious or higher order mixer products. To simplify the discussion, no attempt has been made to show filtering means or other means for rejecting undesired signals while passing the desired signal. Filtering means in the form of a narrow band amplifier, or a narrow band passive filter, have been developed to a high degree and are well known in the art. In addition, in many instances these filter circuit components may be obtained as commercial, off-the-shelf items. It is also recognized that under a different set of circumstances, the difference signal may be selected and utilized.

The $f_0+f_1$ signal is coupled through a common bus to mixers 31 through 34. The variable frequency signal $f_1$ is also coupled to the phase shifting network 18. In FIG. 1 a delay line has been used, though other networks might equally well serve. In passing down the delay line, or phase shifting network 18, the signal is not changed in frequency but its phase at any point along the line is related to its frequency. For example, if the taps 21 through 24 were at exactly one wave length apart at frequency $f_1$ the signals derived therefrom would have identical frequencies and phase. More generally, however, the taps 21 through 24 will not be situated one wave length apart at $f_1$ and accordingly, the signals derived therefrom will all have distinct phases, but the same frequency. In FIG. 1 these phases have been designated $-\theta_0$ through $-\theta_3$. The phase shifted signals are coupled from the phase shift network 18 to a second input of phase mixers 31 through 34. The phase shifted signals at frequency $f_1$ are intermodulated with the $f_0+f_1$ signal obtained from mixer 15 and a fixed frequency signal having the difference frequency, or $f_0$, is obtained from each of the mixers. It is quite obvious that the frequencies of the fixed frequency signals are derived from the fixed frequency signal generators. In the broad sense, however, the phrase "fixed frequency signal" means that the frequencies of these signals are independent of the frequencies of the variable frequency signal generators 13 and 14. Where fixed frequency signal generators are used, as in FIGURE 1, the frequencies of the output signals are fixed and not variable. However, if the fixed frequency signal generators 11 and 12, in FIGURE 1 for example, are replaced by variable frequency signal generators, then the fixed frequency signals derived therefrom will still have a frequency which is totally independent of the variable frequency signal generators 13 and 14. These fixed frequency signals each have a phase determined by the phase of the phase shifted signal from which it is derived. As is well known where signal frequencies are subtracted, their phases are also subtracted. Accordingly, the phases of the signals from mixers 31–34 are positive (FIG. 1).

The phase of the fixed frequency signal $f_0$ has not been considered in the preceeding discussion. Rigorously, since a mixer adds and subtracts phase angles when it generates the sum and difference frequency signals, the phase of the fixed frequency signal $f_0$ should appear on the figure. It will be shown hereinafter, that to include the phase of $f_0$ would needlessly add to the complexity of the drawings and this discussion.

In an identical sequence of events as that just described, the $f_2$ signal from the fixed frequency generator 12 and the $f_3$ signal from the variable frequency signal generator 14 are intermodulated to produce a second plurality of fixed frequency signals, each bearing a related positive phase. In FIG. 1, these signals appear at the outputs of mixers 36 through 39 and have been designated $f_2$ followed by an angle $\phi_0$ through $\phi_3$.

The fixed frequency signals carrying the phase information are applied to a matrix-like arrangement of mixers 41 through 53. A typical example of the operation of these mixers is illustrated by the operaion of mixer 53. It is seen that the mixer 53 receives a signal $f_2$ at the angle $\phi_0$ from the mixer 36 and a signal $f_0$ at an angle $\theta_3$ from mixer 34. These two signals are intermodulated in mixer 43 and a sum signal at the frequency $f_0+f_2$ is obtained. It will be noted, however, that while each signal contains two components of phase, $\theta_0+\phi_0$, these components are determined by the phase associated with the taps in the phase shifting networks from which the signal is generated. It follows, therefore, that the phase components of these signals are determined by the signal generated in the phase shifting network, which in turn are determined by the frequencies $f_1$ and $f_3$ respectively of the variable frequency generators 13 and 14. While the signals $f_1$ and $f_3$, as has been previously stated, vary in frequency to vary the phases of the output signals, it is significant that the signals to and from the mixers 41 through 56 remain fixed in frequency.

Referring briefly to FIG. 1 of the drawing, it will be noted that the frequency of the signals applied to the mixers 41 through 56 are $f_0$ and $f_2$. These signals represent the output signals from the fixed frequency signal generators 11 and 12, with a phase change. Consequently, these output signals are fixed in frequency and remain independent of the frequency variation required to adjust their phase relationship. Accordingly, these mixers, 41 through 56, may be narrow band devices which are adapted to pass the desired frequency, in this case $f_0+f_2$, and reject other frequencies.

It will also be noted in FIG. 1 that the mixers 31 through 34 and 36 through 39 receive at one of their input circuits the frequencies $f_1$ and $f_3$, respectively. Since the $f_1$ and $f_3$ are the steering signals which are varied in frequency to vary the phase relationship, it follows that these frequencies vary widely in frequency. Accordingly, the mixers 31 through 34 and 36 through 39 are adapted to function over a wide band of frequencies.

The above described characteristics of the several mixer circuits may be used to illustrate an important benefit derived from the present invention which can not be obtained with existing systems. As is well known, it is substantially cheaper and substantially easier to construct and design narrow band circuits than circuits which must operate over a relatively wide band of frequencies. In prior systems, the mixers 31 through 34 and 36 through 39, shown in FIG. 1, do not exist. The signals derived from a phase shifting network are coupled directly to a matrix, similar to that formed by mixers 41 through 56. Since these signals are varied over a wide band of frequencies, the matrix of the prior systems are made up of mixers which are wide band devices. In comparison, in the present system the number of mixers in the matrix remains unchanged and, in addition, there has been added a wide band mixer for each tap and for each phase shifting network. As will be seen, a significant advantage flows from being able to make mixers 41 through 56 making up the matrix narrow band devices.

It will also be noted in FIG. 1 that in conjunction with the four taps on each phase shifting network, there are 16 mixers, 41 through 56, in the mixer matrix. In general, if there are $n$ taps on the delay line, $n^2$ mixers are used in the matrix. It has been estimated that the cost of producing a wide band mixer as compared to the cost of producing a narrow band mixer is in the ratio of about 50 to 1 in a frequency range of interest. Thus the reduction in cost of adding $2n$ wide band mixers and reducing the complexity of the $n^2$ mixers may be substantial. The benefit resulting from the use of the present invention is further emphasized by the fact that in the one electronic steerable antenna array design, 10,000 matrix band mixers are called for.

Another significant benefit obtained from the present invention is the tremendous reduction in the problem of blocking spurious signals. One of the most troublesome side effects in an intermodulating, or a heterodyning system, is the generation of spurious signals. The spurious signals generally comprise the unselected sum or difference signal and higher order products related to the frequency of the signals being intermodulated. An effective means for reducing a spurious signal problem is to judiciously select the frequencies of the signals that are intermodulated. Generally, this reduces the problem considerably but does not eliminate it.

In prior systems the spurious signals that remained were particularly troublesome since they did not remain fixed in frequency but varied as the phase carrying signals varied in frequency. As is well known, it is substantially more difficult to remove moving spurious signals than fixed frequency spurious signals. In the present system, the signals entering the mixer matrix are fixed frequency signals, and the spurious signals developed in the mixer matrix are fixed in frequency. In this connection, relatively simple traps and filters may be provided to block the interaction within the mixer matrix of spurious signals.

In the present system, moving spurious signals exist only in the signal lines coupling the phase shifting networks 18 and 19 to the broad band mixers 31 through 34 and 36 through 39. Their effect in this region is not serious since the number of required means for minimizing their effect on the system, are limited to the number of taps found on the phase shift networks 18 and 19. Here again the advantage lies in reducing the cost of the most frequently used circuits at the minor expense of adding a small number of more complicated circuits.

Another important advantage achieved by the present system, and not available in prior systems, is the availability of a fixed frequency signal path into which, if it is so desired, a phase shifter may be included for individually shifting the phase of a particular signal. Where the frequency is constant the phase shifter may take the form of a length of a coaxial line for example. This simple and relatively inexpensive means could not be used where the frequency varied, since the phase shift of a length of line is a function of the frequency applied thereto. This technique is illustrated by the dash outline designated phase shifter 58 shown between mixer 34 and 53.

Figure 2:
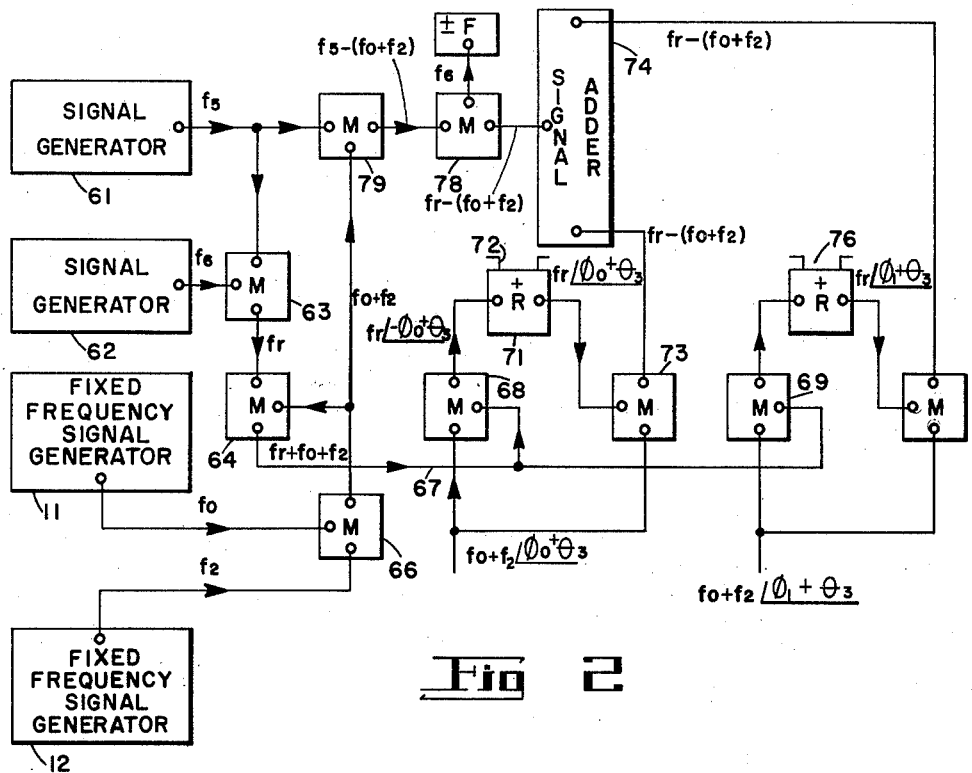
FIG. 2 is a block representation of a portion of a novel transmitting and receiving system showing its utilization of the signals generated in the FIG. 1 signal synthesizing system.

Description and operation of the FIG. 2 receiver and transmitter

Referring to FIG. 2 of the drawings there is represented a block diagram of a transmitter-receiver which utilizes the signals generated in a signal synthesizing system of the type shown in FIG. 1 just described to provide a novel system. It is proposed, in FIG. 2, to heterodyne the fixed frequency phase carrying output signal from the signal synthesizer system to another fixed frequency signal for generating a radiated signal. The FIG. 2 transmitter-receiver also makes provision for using a heterodyning operation for converting an applied radiated signal to an intermediate frequency signal. In this connection the transmitter-receiver includes a signal generator 61 and a signal generator 62, both operated at a fixed frequency. These may be constructed as crystal controlled oscillators. The signals from signal generators 61 and 62, designated $f_5$ and $f_6$, are coupled through a mixer 63 wherein there is developed an output signal $f_r$. The signal $f_r$ is coupled to a mixer 64.

The fixed frequency signal generators 11 and 12 are used to generate the radiated frequency as shown in FIG. 2. Their output signals $f_0$ and $f_2$, respectively, are intermodulated in a mixer 66 and the sum signal is coupled to a second input circuit of mixer 64. The selected output signal from mixer 64 is designated $f_r+f_0+f_2$. This signal is coupled to a common bus 67 to the input circuits of a pair of transmitter mixers 68 and 69. The second input signal to these transmitter mixers 68 and 69 comprise the signal derived from the signal synthesizing system as indicated. The output from these mixers is taken as the difference frequency signal which is designated $f_r$.

In the manner previously described, the $f_r$ signal also acquires the phase information carried by the signal synthesizer signal from which it is derived. The $f_r$ signal is coupled through a transmit-receive tube, 71, to an antenna radiator 72. The TR tube 71 functions in a conventional manner to alternatively adapt the radiator 72 to transmit or receive signals.

It is well known that the antenna radiator transmits and receives radiated signals in substantially the same way, except for a phase reversal on reception. Therefore, the radiators will break down a received signal into a plurality of signals bearing a phase relationship which is the negative of those of the output signals which were transmitted. Accordingly, the radiated signal coupled from radiator 72 to mixer 73 has a phase equal to $(\phi_0+\theta_3)$. See FIGURE 2.

The received signals are intermodulated with in phase signals from the signal synthesizing system and a plurality of received signals, taken at the difference frequency between the intermodulated signals are generated. It follows, therefore, that the received signal frequency equals $f_r-(f_0+f_2)$ and, steering phases of the incoming signals are subtracted from like phases from signal synthesizing system, these received signals are all in phase with one another.

The individual received signals are coupled to a signal adder 74 which combines these signals into a single received signal. The single received signal is coupled from the signal adder 74 to a mixer 78. It will be noted in FIG. 2 that a portion of the signal from the signal generator 61 and a mixer 66 are intermodulated in a mixer 79 to generate a signal whose frequency is equal to $f_5-(f_0+f_2)$. This signal is also coupled to mixer 78 where it is intermodulated with the received signal from the signal adder to produce an IF (intermediate frequency) signal whose frequency is $f_6$. The IF signal is produced by taking the difference frequency of the input signals coupled to mixer 78, it being recalled that $f_r-f_5$ is equal to $f_6$ or the frequency of the signal generated in the signal generator 62.

Theory

Figure 3:
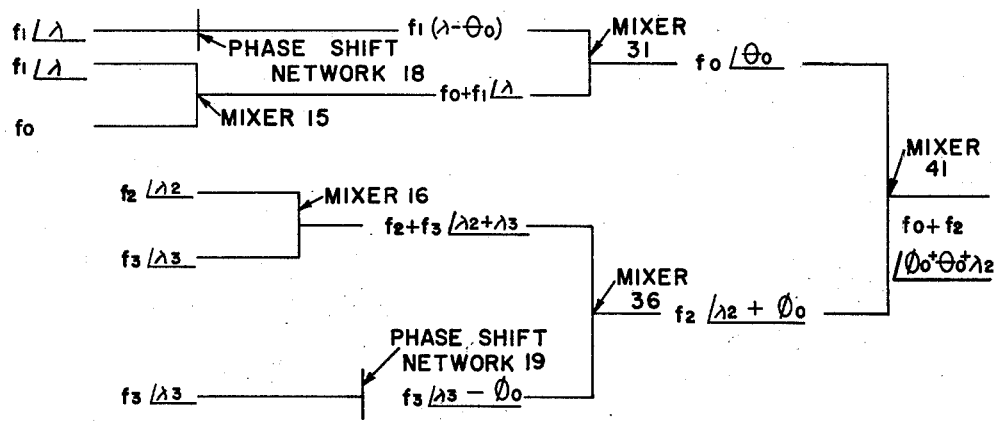
FIG. 3 is a chart which is helpful for explaining the operation of the signal synthesizing system.

It had been previously stated that the phases of the signals obtained from the various fixed and variable frequency generators could be ignored for purposes of discussing the present invention, it being only necessary to follow the path of the phase shifted signals developed in the phase shifting networks. Proof of this assumption will now be shown by referring to the flow diagram represented in FIG. 3. In FIG. 3 arbitrary phase angle have been assigned to all signals considered in the signal synthesizing system. For purposes of this example, the signal at frequency $f_0$ from the fixed frequency signal generator 11 is assumed to be the reference signal and therefore, have zero phase shift. The signal $f_1$ is assumed to have a phase difference equal to $\lambda$. The $f_2$ signal includes a phase angle $\lambda_2$ and the $f_3$ signal, phase angle $\lambda_3$. As seen in FIG. 3 the $f_1$ signal in passing through the phase shift network 18 is shown to have picked up an additional phase angle $-\theta_0$ before it is applied to mixer 31. In mixer 15 the $f_1$ and $f_0$ signal are intermodulated to generate a sum signal whose phase angle is shown to be $\lambda$. The output from mixer 15 is also applied to mixer 31 where it is intermodulated to produce a signal whose frequency is a difference of the frequency signals applied thereto. In this case the difference frequency is $f_0$. Since in generating the difference signals, the phase angle subtracts the phase of the difference signal $f_0$ is $\theta_0$, as indicated.

In an identical procedure the sequence of events are repeated with respect to the signals $f_2$ and $f_3$ and there is generated a fixed frequency signal $f_2$ at an angle $\lambda_2+\phi_0$. These two signals meet in mixer 41 where they are intermodulated to obtain a sum frequency signal which represents what has been previously described as the output signal from the signal synthesizer system. It will be noted that this signal includes the phase angle $\phi_0+\theta_0+\lambda_2$. However, in proceeding, as described above, for the other signals it will be seen that the phase $\lambda_2$ is common to all these signals. To make this signal representative of the phase $\phi_0+\theta_0$ alone, it is merely necessary to include a fixed amount of phase shift at the output of the fixed frequency generator 12 which would shift the phase of that signal until its phase equals zero. This adjustment, or calibration, as you will note is a one time adjustment since the frequency of $f_2$ is fixed and its phase will remain fixed. In the manner just indicated the output signals from the signal synthesizer 10 have been made to reflect solely the phases of the phase shifted signal developed in the phase shifting networks 18 and 19.

It is now obvious that in transmitter-receivers the radiating frequency may be adjusted independently of the phase determining frequencies by merely adjusting the frequency of the signal generators 61 and 62. These may be ganged together in a simple one knob tuning device. On the other hand, it is also obvious that the phase determining frequencies may be varied independently of the radiated frequencies by merely varying the frequency of the variable frequency generators 13 and 14. This also becomes a simple one knob adjustment. These and the aforementioned advantages of the present invention will become instantly clear when the signal synthesizing system, and transmitter-receiver, described herein, are compared with prior systems.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A signal synthesizing system for developing a plurality of output signals having the same frequency and two predetermined components of phase comprising: a fixed frequency signal generating means; a first variable frequency signal generating means; a second variable frequency signal generating means; first mixing means for intermodulating the signals from said fixed frequency generator and said first variable frequency generating means; second mixing means for intermodulating the signals from said fixed frequency generator and said second variable frequency generator; a first phase shifting network coupled to said first variable frequency signal generator for developing first phase shifted signals at said generator frequency; a second phase shift network coupled to said second variable frequency signal generator for developing second phase shifted signals at said second generator frequency; a first plurality of mixing means for intermodulating the first phase shifted signals and the signal from said first mixing means; a second plurality of mixers for intermodulating said second phase shifted signals and the signal from said second mixing means for developing a second plurality of fixed frequency phase shifted signals; and a third plurality of mixers for intermodulating the first and second plurality of fixed frequency phase shifted signals for developing output signals all having the same frequency and each having a phase which is a function of the phases of the first and second fixed frequency phase shifted signals.

2. A signal synthesizing system for developing an output signal having predetermined components of phase comprising: a fixed frequency signal generating means; a first variable frequency signal generating means; a first phase shifting network coupled to receive a signal from said first variable frequency signal generating means for varying the phase of the signal, said first phase shifting network having an output circuit means for providing a phase shifted signal having a preselected phase at the frequency of said signal generating means; a second variable frequency signal generating means; a second phase shifting network coupled to receive a signal from said second variable frequency signal generating means for varying the phase of the signal, said second phase shifting network having an output circuit means for providing a phase shifted signal having a preselected phase, at the frequency of said second variable frequency signal generating means; a first mixing means for intermodulating the signals from said fixed frequency generator and said first phase shifting network; a second mixing means for intermodulating the signals from said fixed frequency generator and said second phase shifting network; and output mixing means for intermodulating the signals from the first and second mixing means for generating an output signal having a phase which is a function of the phases of the intermodulated signals.

3. In combination with an antenna comprising a radiating element, a signal synthesizing system for developing a radiated signal having predetermined components of phase comprising: means for generating a first phase shifted signal having a preselected frequency and phase; means for generating a second phase shifted signal having a preselected frequency and phase; means for generating a modulation signal whose frequency is a fixed difference from the first and second phase shifted signal; means for intermodulating the first phase shifted signal and the modulation signal for developing a first fixed frequency signal having a frequency equal to the fixed difference and a phase which is representative of the phase of the first phase shifted signal; means for intermodulating the second phase shifted signal and the modulation signal for developing a second fixed frequency signal having a frequency equal to the fixed difference and a phase representative of the second phase shifted signal; and circuit means coupled between the radiating element and said modulating means for receiving the first and second plurality of fixed frequency signals for intermodulating the first and second fixed frequency signals for developing a radiated signal having a phase and a frequency which is a function of the phases and frequencies of the intermodulated first and second fixed frequency signals.

4. In combination with an antenna comprising a plurality of radiating elements, a signal synthesizing system for developing a plurality of radiated signals having the same frequency and predetermined components of phase comprising: a fixed frequency signal generating means; a first variable frequency signal generating means; a second variable frequency signal generating means; first mixing means for intermodulating the signals from said fixed frequency signal generator and said first variable frequency signal generating means; second mixing means for intermodulating the signals from said fixed frequency signal generator and said second variable frequency signal generator; a first phase shifting network coupled to said first variable frequency signal generator for developing first phase shifted signals at said generator frequency; a second phase shift network coupled to said second variable frequency signal generator for developing second phase shifted signals at said second generator frequency; a first plurality of mixing means for intermodulating the first phase shifted signals and the signal from said first mixing means for developing a first plurality of fixed frequency phase shifted signals; a second plurality of mixers for intermodulating said second phase shifted signals and the signal from said second mixing means for developing a second plurality of fixed frequency phase shifted signals; a third plurality of mixers coupled between the radiating elements and said first and second plurality of mixers for intermodulating the first and second fixed frequency signal for developing radiating signals all having the same frequency and each having a phase which is a function of the phases of the first and second fixed frequency signals.

5. In combination with an antenna having a radiator adapted to transmit or receive radiated signals having a predetermined phase; a first signal supply means for providing a fixed frequency signal having a preselected phase, said phase being variable without changing the frequency of the signal; a second signal supply means for providing a variable frequency signal; means coupled to the radiator for intermodulating the fixed frequency signal with the variable frequency signal for developing a radiated signal whose frequency is a function of the variable frequency signal and whose phase is a function of the phase of the fixed frequency signal, the frequency and phase of the radiated signal being each variable independently of the other; receiving means coupled between the radiator and said first signal supply means adapted to receive an in phase signal from the radiator and said first signal supply means for generating a received signal; and means for alternatively adapting the radiator to transmit and receive radiating signals.

6. In combination with an antenna having a plurality of radiators adapted to transmit or receive radiated signals having a predetermined phase relatonship; a first signal supply means for providing a plurality of fixed frequency output signals having a preselected phase relationship, said phase relationship being variable without changing the frequency of the signals; a second signal supply means for providing a variable frequency signal; means coupled to the radiators for intermodulating the fixed frequency output signals with the variable frequency signal for developing radiated signals whose frequencies are a function of the variable frequency signal and further having a phase relationship which is a function of the phase relationship of the fixed frequency signals, the frequency and phase relationship of the radiated signals being each variable independently of the other; receiving means coupled between the radiators and said first signal supply means adapted to receive in phase signals from the radiators and said first signal supply means for generating a received signal; and means for alternatively adapting the radiators for transmitting and receiving radiated signals.

7. A combination as described in claim 6 in which said first signal supply means comprises; a signal synthesizing system having means for developing a first plurality of fixed frequency signals having a preselected phase relationship; means for developing a second plurality of fixed frequency signals having a preselected phase relationship; and circuit means coupled to and responsive to the second plurality of signals for developing a plurality of output signals having a phase relationship which is a function of the phases of the first and second plurality of signals.

8. In combination with an antenna having a radiator adapted to transmit or receive radiated signals having a predetermined phase, a first signal supply means for providing a fixed frequency signal having a preselected phase, said phase being variable without changing the frequency of the signal; a second signal supply means for providing a variable frequency signal; means coupled to the radiator for intermodulating the fixed frequency signal with the variable frequency signal for developing a radiated signal whose frequency is a function of the variable frequency signal and whose phase is a function of the phase of the fixed frequency signal, the frequency and phase of the radiated signal being each variable independently of the other; receiving means for receiving phase related signals, said receiving means being coupled between the radiator and said first signal supply means for intermodulating the phase related signals with in phase signals from said first signal supply means for generating a received signal; and means for alternatively adapting the radiator to transmit and receive radiated signals.

9. A signal synthesizing system for developing a plurality of output signals having predetermined components of phase comprising: a fixed frequency signal generating means; a first variable frequency signal generating means; a first phase shifting network coupled to receive a signal from said first variable frequency signal generating means for varying the phase of the signals, said first phase shifting network having a plurality of output circuit means for providing phase shifted signals having a preselected phase relationship at the frequency of said first variable frequency signal generating means; a second variable frequency signal generating means; a second phase shifting network coupled to receive a signal from said second variable frequency signal generating means for varying the phase of the last mentioned signal, said second phase shifting network having a plurality of output circuit means for providing phase shifted signals having a preselected phase relationship at the frequency of said second variable frequency signal generating means; a first mixing means for intermodulating the signals from said fixed frequency signal generator means and said first phase shifting network; a second mixing means for intermodulating the signals from said fixed frequency signal generator means and said second phase shifting network; and output mixing means for intermodulating the signals from said first and second mixing means for generating output signals having phases which are a function of the phases of the intermodulated signals.

10. A signal synthesizing system as described in claim 9 wherein said output mixing means comprises a third plurality of mixers for intermodulating each of said first plurality of fixed frequency phase shifted signals with each of the second plurality of fixed frequency phase shifted signals.

11. A signal synthesizing system for developing a plurality of output signals having predetermined components of phase comprising: means for generating first and second plurality of phase shifted signals, each plurality of signals having the same frequency and being related in phase; a signal generator; means coupled to said signal generator and said first mentioned means for generating first and second modulation signals whose frequencies differ from the frequencies of the first and second plurality of phase shifted signals; means for intermodulating the first and second plurality of phase shifted signals and the first and second modulation signals, respectively, for developing first and second plurality of fixed frequency signals, each plurality of fixed frequency signals having a frequency which is a function of the frequency of said signal generator and phase relationships representative of the plurality of phase shifted signals from which they are derived; and circuit means coupled to and responsive to the first and second plurality of fixed frequency signals for developing a plurality of output signals having a frequency and a phase relationship which are a function of the frequencies and phases of the first and second plurality of fixed frequency signals.

12. A signal synthesizing system for developing a plurality of output signals having predetermined components of phase comprising: means including a first variable frequency signal generator for generating a first plurality of phase shifted signals all having the same frequency and each being related in phase; means including a second variable frequency signal generator for generating a second plurality of phase shifted signals all having the same frequency and each being related in phase; a third signal generator; means coupled to said third signal generator and said first and second variable frequency signal generators for generating first and second modulation signals whose frequencies differ from the frequencies of the first and second phase shifted signals; means for intermodulating the first phase shifted signals and the first modulation signal for developing a plurality of fixed frequency signals all having a frequency, which is a function of frequency of said third signal generator, and each having a phase which is representative of the phases of the first plurality of phase shifted signals; means for intermodulating the second plurality of phase shifted signals and the second modulation signal for developing a second plurality of fixed frequency signals all having a frequency, which is a function of the frequencies of said third signal generator, and each having a phase representative of the second plurality of phase shifted signals; and circuit means coupled to and responsive to the first and second plurality of fixed frequency signals for developing a plurality of output signals having a frequency and a phase relationship which are a function of the frequencies and phases of the first and second plurality of fixed frequency signals.

References Cited by the Examiner

UNITED STATES PATENTS

| | | | |
|---|---|---|---|
| 1,669,123 | 5/28 | Espenschied et al. | 343—854 X |
| 2,030,181 | 2/36 | Potter | 343—854 X |
| 2,225,928 | 12/40 | Ring | 343—100.6 |
| 2,437,281 | 3/48 | Tawney | 343—778 X |
| 3,005,960 | 10/61 | Levenson | 343—100.6 |
| 3,141,165 | 7/64 | Kahrilas | 343—100 |

CHESTER L. JUSTUS, *Primary Examiner.*